(12) United States Patent
Scholl et al.

(10) Patent No.: US 8,190,370 B2
(45) Date of Patent: May 29, 2012

(54) CHANGE MANAGEMENT OF PROCESS FLOW DESCRIPTIONS

(75) Inventors: Juergen Scholl, Bretten (DE); Dirk Rohdemann, Muehlhausen (DE); Thomas Vomhof, Wiesloch (DE)

(73) Assignee: SAP Aktiengesellschaft, Walldorf (DE)

( * ) Notice: Subject to any disclaimer, the term of this patent is extended or adjusted under 35 U.S.C. 154(b) by 1867 days.

(21) Appl. No.: 10/210,201

(22) Filed: Jul. 31, 2002

(65) Prior Publication Data

US 2003/0195779 A1    Oct. 16, 2003

Related U.S. Application Data

(60) Provisional application No. 60/372,896, filed on Apr. 15, 2002.

(51) Int. Cl.
  *G01N 33/48* (2006.01)
  *G06F 7/60* (2006.01)
  *G06G 7/58* (2006.01)

(52) U.S. Cl. .......... 702/19; 702/20; 703/2; 703/11

(58) Field of Classification Search .......... None
  See application file for complete search history.

(56) References Cited

U.S. PATENT DOCUMENTS

| | | |
|---|---|---|
| 5,291,394 A | 3/1994 | Chapman |
| 5,499,188 A | 3/1996 | Kline et al. |
| 5,576,946 A | 11/1996 | Bender et al. |
| 5,748,478 A | 5/1998 | Pan et al. |
| 5,901,062 A | 5/1999 | Burch et al. |
| 6,115,646 A | 9/2000 | Fiszman et al. |
| 6,415,193 B1 | 7/2002 | Betawar et al. |
| 6,522,934 B1 | 2/2003 | Irwin et al. |
| 6,834,370 B1 | 12/2004 | Brandl et al. |

OTHER PUBLICATIONS

Engebrecht et al., "Minipreps of Plasmid DNA", 1991. In Current Protocols in Molecular Biology, Ed. Ausubel et al., Unit 1.6.*
Definition for "associate." Printed from the internet, <http://www.m-w.com/cgi-bin/dictionary?book=Dictionary&va=associate> on Nov. 10, 2005.*
"Batch Control, Part 1: Models and Terminology", Instrument Society of America, Approved Oct. 23, 1995.
"Batch Control, Part 2: Data Structures and Guidelines for Languages", Draft 14, Instrument Society of America, (Editor's Draft) May 1999.

* cited by examiner

*Primary Examiner* — Shubo Zhou
(74) *Attorney, Agent, or Firm* — Fish & Richardson P.C.

(57) ABSTRACT

A computer-implemented method for managing change of sets of processing information that describe a process flow includes receiving a first activity description describing a first activity for performing a process flow, receiving a first formula description describing a first input and an output of the process flow, receiving a second formula description describing a second input and the same output of the process flow, and associating the first activity description with one of the first formula description and the second formula description.

23 Claims, 14 Drawing Sheets

| | | | | | |
|---|---|---|---|---|---|
| Recipes | | | | | |
| ID# 573.1 | Omelet | Spinach | Y | Formula<br>-3 Extra Large Eggs<br>-6g Spinach<br>-0.2g Salt | Element Hierarchy |
| ID# 574.1 | Omelet | Spinach | N | Formula<br>-4 Medium Eggs<br>-7g Spinach<br>-0.25g Salt | Element Hierarchy |
| ID# 575.1 | Omelet | Spinach | N | Formula<br>-3 Extra Large Eggs<br>-6g Spinach<br>-0.2g Salt | Element Hierarchy |
| 230 | 235 | 240 | 245 | 260 | 265 |

Columns 205, 405, 410 group the rows.

Recipes

| | | | | | | Formula | Element Hierarchy |
|---|---|---|---|---|---|---|---|
| ID# 573.1 | Omelet | Spinach | Y | 6/1999 | 9/2001 | -3 Extra Large Eggs<br>-6g Spinach<br>-0.2g Salt | Element Hierarchy |
| ID# 573.2 | Omelet | Spinach | Y | 7/2001 | 2/2002 | -3 Extra Large Eggs<br>-5.8g Spinach<br>-0.2g Salt | Element Hierarchy |
| ID# 573.3 | Omelet | Spinach | Y | 2/2002 | 9/2003 | -3 Extra Large Eggs<br>-5.8g Spinach<br>-0.2g Salt | Element Hierarchy |

FIG. 7

Figure 9:
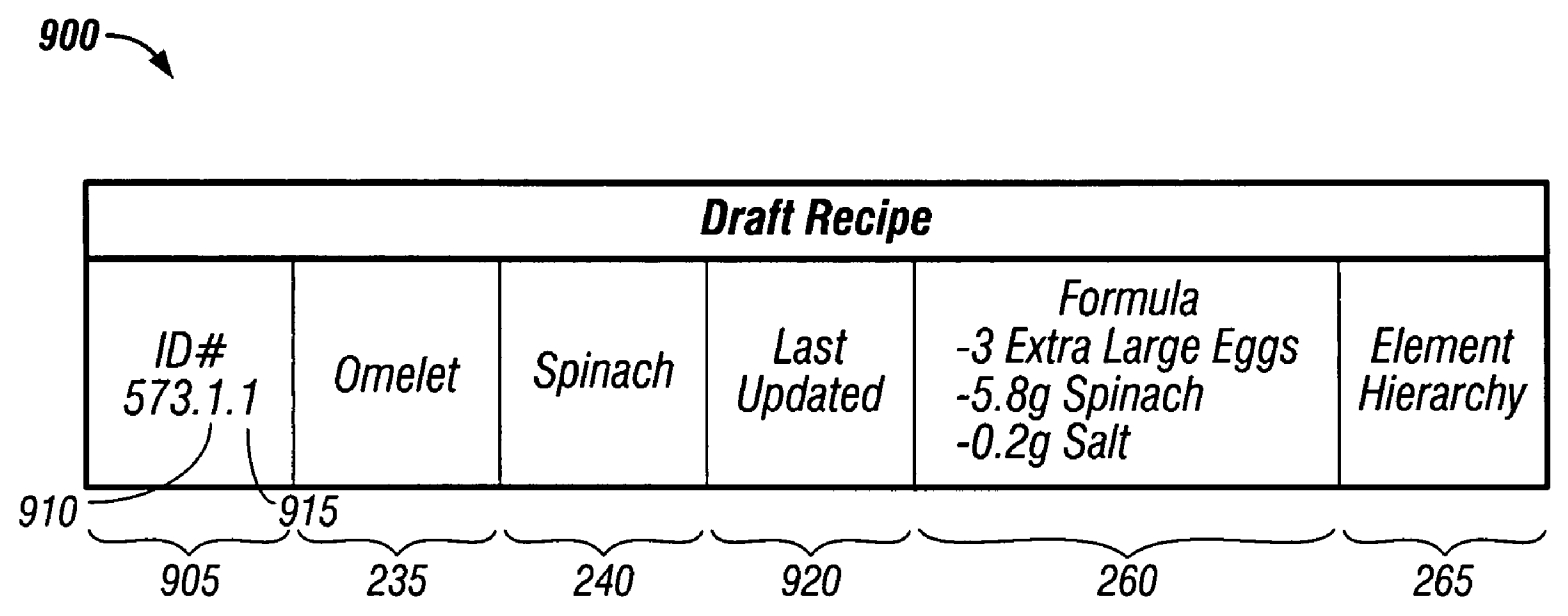

| Draft Recipe | | | | | |
|---|---|---|---|---|---|
| ID# 573.1.1 | Omelet | Spinach | Last Updated | Formula -3 Extra Large Eggs -5.8g Spinach -0.2g Salt | Element Hierarchy |
| 905 | 235 | 240 | 920 | 260 | 265 |

CHANGE MANAGEMENT OF PROCESS FLOW DESCRIPTIONS

CROSS-REFERENCE TO RELATED APPLICATIONS

This application claims the priority of U.S. Provisional Application Serial No. 60/372,896, filed Apr. 15, 2002 and entitled "RECIPE MANAGEMENT," which is hereby incorporated by reference in its entirety.

BACKGROUND

This invention relates to change management of recipes and other sets of processing information that describe a process flow.

Recipes include a hierarchical description of a process flow. A process flow is a sequence of chemical, physical, or biological activities for the conversion, transport, or storage of material or energy. For example, process flows are used for the production of specialty chemical products, pharmaceutical products, fuels, cosmetics, and foodstuffs. Recipes can also include definitions of resources such as equipment that is deployed to perform the process flow, as well as materials input to perform the process flow and output materials resulting from performance of the process flow.

Recipes often include several different classes of process elements that are arranged in the recipe hierarchy and describe the process flow at various levels of detail. Recipes can also include definitions of resource, input, and output requirements for the process flow.

There are different classes of recipes. General recipes ("GR") include information related to the process flow independent of specific production resources. General recipes identify raw materials, relative quantities, and required processing, but lack specific information regarding a particular site or the resources available at that site. Site recipes ("SR") include site-specific information related to the local constraints, such as language and available raw materials at a particular production locale. Master recipes ("MR") include resource capabilities such as equipment deployable to perform a process flow, and describe activities for a specific production on a specific line. Master recipes can also include information that is specific to a process cell.

One use of recipes and process flows is in the manufacture and the production of products. In this case, a process flow typically represents some manufacturing or production operation. The information included with the process flow in the recipe describes, e.g., the manufacturing or production process, raw materials, and available equipment.

SUMMARY

The present invention provides methods and apparatus, including computer program products, for managing change of recipes and other sets of processing information that describe a process flow.

In general, in one aspect, a computer-implemented method for managing change of sets of processing information that describe a process flow includes receiving a first activity description describing a first activity for performing a process flow, receiving a first formula description describing a first input and an output of the process flow, receiving a second formula description describing a second input and the same output of the process flow, and associating the first activity description with one of the first formula description and the second formula description.

The invention can be implemented to include one or more of the following advantageous features. The method for managing change can include determining whether to associate the first activity description with the first formula description or the second formula description. This can be done, e.g., by executing a rule to make the determination, or receiving input from a user, the input identifying one of the first formula description and the second formula description for storage in association with the first activity description.

Associating the first activity description can include providing the first activity description with a new key for identifying the first activity description, or copying the first activity description from a second activity description. Copying the first activity description can include identifying a relationship such as, e.g., a predecessor/successor relationship, between the first activity description and the second activity description. Identifying the relationship can include linking the first activity description and the second activity description.

Associating the first activity description can include linking the first activity description to the one of the first formula description and the second formula description, or adding the one of the first formula description and the second formula description to the first activity description. Receiving the first activity description can include receiving an element hierarchy. Each element can describe an activity for performing the process flow. Receiving the first formula description can include receiving a first lifespan of the first formula and receiving the second formula description can include receiving a second lifespan of the second formula. The first lifespan and the second lifespan can overlap. The first formula description and the second formula description can be linked based on the first lifespan and the second lifespan. The second formula description can be an alternative formula to the first formula description. Receiving the first activity description can include receiving the first activity description describing the first activity for the conversion of material.

In another general aspect, a computer program product for managing change of a set of processing information that describe process flows can include instructions to cause a processor to receive a draft set of processing information that describes a process flow, update the draft set of processing information to reflect an approach to improving the process flow or other portion of the processing information, receive a copy command, and copy, in response to receipt of the copy command, the updated draft set of processing information to create a set of processing information that includes the approach. The product can be tangibly stored on machine readable media.

The invention can be implemented to include one or more of the following advantageous features. The instructions can also cause the processor to update the draft set of processing information to reflect an approach to improving an activity in the process flow. The draft set of processing information can be updated to reflect an approach to improving an input to the process flow.

The instructions can also cause the processor to identify a relationship between the set of processing information and a second set of processing information that does not include the approach. A lifespan of the set of processing information can be received and the relationship can be identified based upon the received lifespan. A predecessor/successor relationship between the set of processing information and the second set of processing information can also be identified. The set of processing information and the second set of processing information can be linked to indicate the predecessor/successor relationship. The set of processing information and the second set of processing information can be identified as alternatives with a same output. The draft set of processing information can be updated to reflect a second approach to improving the process flow or other portion of the processing information. The updated set of processing information can be copied to create a second set of processing information that includes the second approach.

The instructions can also cause the processor to receive a first lifespan of the set of processing information and receive a second lifespan of the second set of processing information. The first lifespan and the second lifespan can overlap in time. A key for identifying the set of processing information can be specified. At least a portion of the key can be the same as a portion of a draft key for identifying the draft set of processing information. The draft set of processing information can be updated without creating a new key for identifying the draft set of processing information. The draft set of processing information can describe a conversion of material.

The invention can be implemented to realize one or any combination of the following advantages. The conditions under which products are manufactured or produced are always changing, e.g., suppliers change, the materials and equipment used for production change, the regulatory environment changes, consumer requirements change, and technology progresses to develop improved manufacturing or production procedures. The net effect of change in the commercial, regulatory, and technical environment is the constant creation and alteration of recipes and other descriptions of process flows.

Recipes, and other descriptions of process flows, can be managed and classified using the methods and apparatus, including computer program products, of the present invention. In particular, the production of new recipes can be facilitated, the classification of existing recipes can occur quickly, and existing recipes can be rapidly and easily identified when needed. These capabilities allows recipe developers and manufacturers to keep pace with process changes, while manufacturing products quickly and efficiently, which is beneficial since the ability to rapidly change production of a product at a particular site is often instrumental in determining the profitability of the product. For example, if a memory chip manufacturer requires a long time to bring a new memory chip to market, then rapid changes in the semiconductor industry may, over time, decrease the desirability of the new memory chip and erode the profit that can be reaped by producing the new memory chip. As another example, unexpectedly high or seasonal increases in demand for a particular food product may be met by a producer that rapidly scales up production volume at several different sites, and then lowers production once the high or seasonal demand has been met. Without the ability to rapidly classify, locate, and create diverse recipes, the opportunity to maximize profits from a product can be lost.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 shows another example table that can be used to manage recipes and other sets of processing information that describe a process flow.

FIG. 7 shows another example table that can be used to manage change of recipes and other sets of processing information that describe a process flow.

FIG. 9 shows a draft recipe that can be used to manage change in recipes and other sets of processing information that describe a process flow.

Like reference symbols in the various drawings indicate like elements.

DETAILED DESCRIPTION

Figure 1:
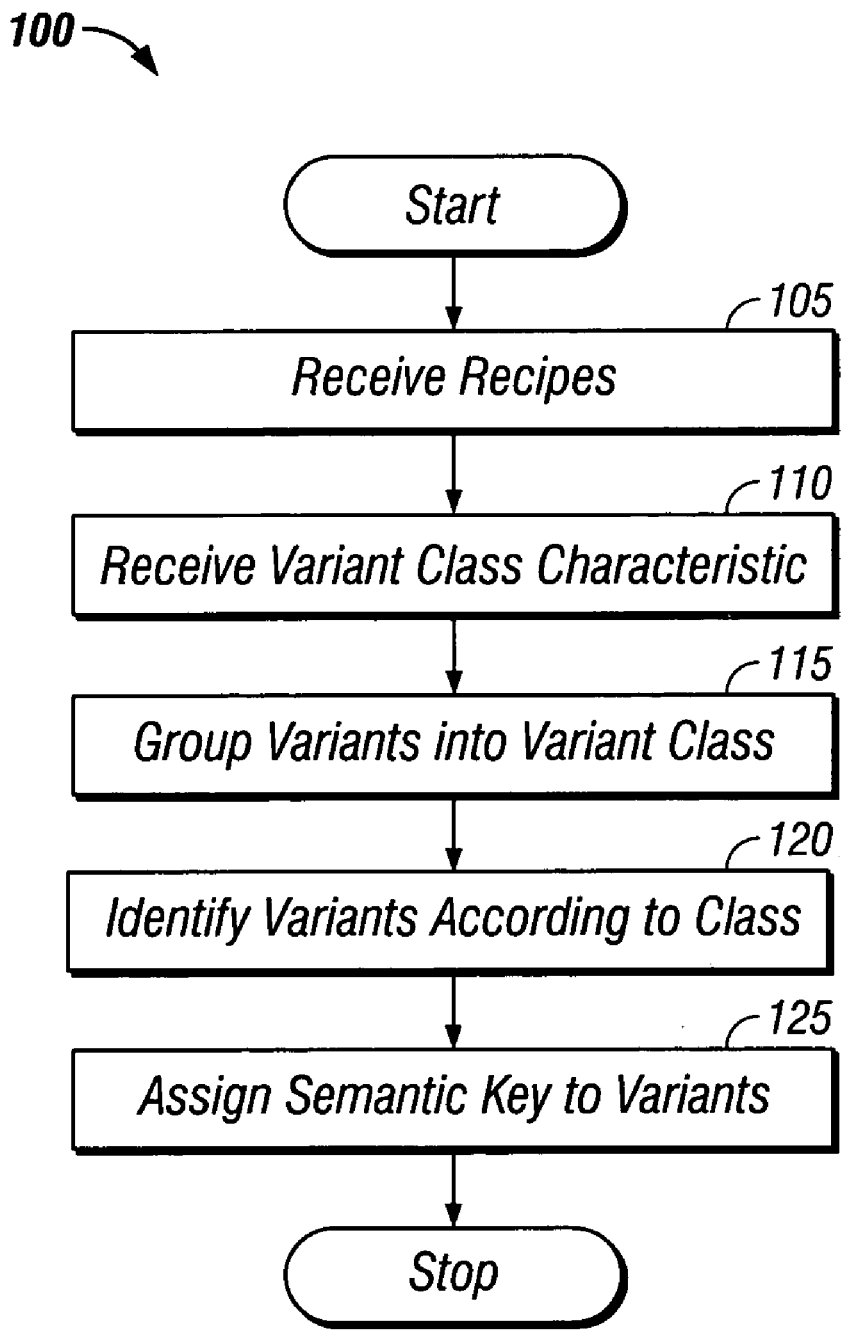
FIG. 1 shows a method for managing recipes and other sets of processing information that describe a process flow.

FIG. 1 shows a method 100 for managing recipes and other sets of processing information that describe a process flow. A system performing the method 100 receives one or more recipes or other sets of processing information that describe a process flow (step 105). The recipe can be, e.g., one or more general recipes, site recipes, master recipes, or combinations thereof. The system can receive the recipes from a user through an input device, or from another computer system. The recipes can be stored, e.g., in a recipe database.

At least two of the received recipes are variants within a single variant class. Variants are recipes that describe similar process flows but produce slightly different outputs. For example, one recipe can describe a process for producing a polymer with a certain average molecular weight, while a second, variant recipe can describe a similar process for producing the same polymer with a larger average molecular weight.

Variants can describe different activities, different formulae, or both. A formula is a list of inputs and outputs of a recipe. For example, two different variants can describe two different catalysts that can be input into a single process to achieve two different average molecular weights of a polymer. As another example, two different variants can describe two different reaction temperatures that can be used with a single formula to achieve two different average molecular weights of the polymer.

The system also receives a characteristic of a variant class for use in classifying the variants (step 110). The characteristic can be a generic characteristic of the slightly different outputs of the recipe variants. The information can be received from a user so that the recipes can be categorized in accordance with a user's understanding of the distinguishing characteristics of the outputs of the recipes. For example, a user may wish to classify variants according to a commercial category of the product, or according to a physical property such as the glass transition temperature of the product.

The system groups the variants of the recipe into variant classes based on the received characteristic of the variant class (step 115). For example, if the user identifies that recipes are to be categorized according to the commercial category of the product, the system accesses the received recipes and identifies recipes that yield outputs within the identified commercial category.

The system then identifies the variants according to variant class (step 120). The system can identify the variants outside the semantic key of the variants. A semantic key is a key that has potential values that have an obvious meaning to the user of the key. In order to identify the variants outside a semantic key, for example, the system can identify the variants by assigning the variants a common extension or field. Since the class of the variants-can be identified outside the semantic key, the system can also assign a unique semantic key to each recipe (step 125). The semantic key can be, e.g., an recognizable name or recipe ID number.

Alternatively, the class of the variants can be identified within the semantic key. For example, the semantic key may include a prefix that identifies the class of the recipe.

In addition to the semantic key, recipes and recipe variants can have several different identifiers for different contexts. For example, recipes can be identified by the physical properties of the products of the recipe, the by-products of the recipe, and the formula of a recipe. By using several different identifiers, the identification of recipes in different business contexts is hastened.

Figure 2:
FIG. 2 shows an example table that can be used to manage recipes and other sets of processing information that describe a process flow.

FIG. 2 shows a table 200 wherein several recipe variants are managed in accordance with method 100. Table 200 includes recipe records 205, 210, 215, 220, 225 that each describe a process flow for making a food product. Recipe records 205, 210, 215, 220, 225 can be variants within one or more variant class. For example, recipe records 205, 210, 215 can be variants within the omelet class, while recipe records 220, 225 can be variants within the pancake class. In particular, recipe record 205 can describe a process flow for making a spinach variant within the omelet class; recipe record 210 can describe a process flow for making a cheese variant within the omelet class; recipe record 215 can describe a process flow for making a ham and cheese variant within the omelet class; recipe record 220 can describe a process flow for making a blueberry variant within the pancake class; and recipe record 225 can describe a process flow for making a strawberry variant within the pancake class.

Table 200 also includes fields 230, 235, 240, 245, 260, 265. Field 230 can include recipe ID numbers that act as semantic keys for recipe records 205-225. Field 235 can identify the variant class of recipe records 205-225. Field 240 can include information that identifies the difference between the outputs of recipe records 205-225 within a variant class. Field 245 can include flags that indicate whether recipe records 205-225 are the default versions of those recipes, as discussed further below. Field 260 can include information that describes the formulae for recipe records 205-225. Field 265 can include information that describes the process element hierarchy for recipe records 205-225.

The classification and management of recipe variants and variants of other sets of processing information that describe a process flow speeds the identification of existing recipes. In particular, since recipes can be classified according to generic characteristics of the outputs of the recipes, a user who is interested in obtaining a product with a particular characteristic can rapidly sort through large numbers of recipes.

Moreover, the classification of recipes can be performed according to a user's understanding of the distinguishing characteristics of the variant classes. For example, recipes for the production of polymers can be classified according to, e.g., a characteristic of the activities that produce the polymer (e.g., a free-radical reaction vs. a condensation reaction); a characteristic of equipment that performs the activities (e.g., a plug-flow reactor vs. a batch reactor), a characteristic of the formula that produces the polymer (e.g., a glycolic acid reactant vs. a lactic acid reactant) or any other distinguishing characteristic that the user understands as distinguishing the variant classes.

One particular type of variant is the internal variant. Internal variants are recipes that produce a wide spectrum of outputs based on parameters that are received from a producer during production.

Figure 3:
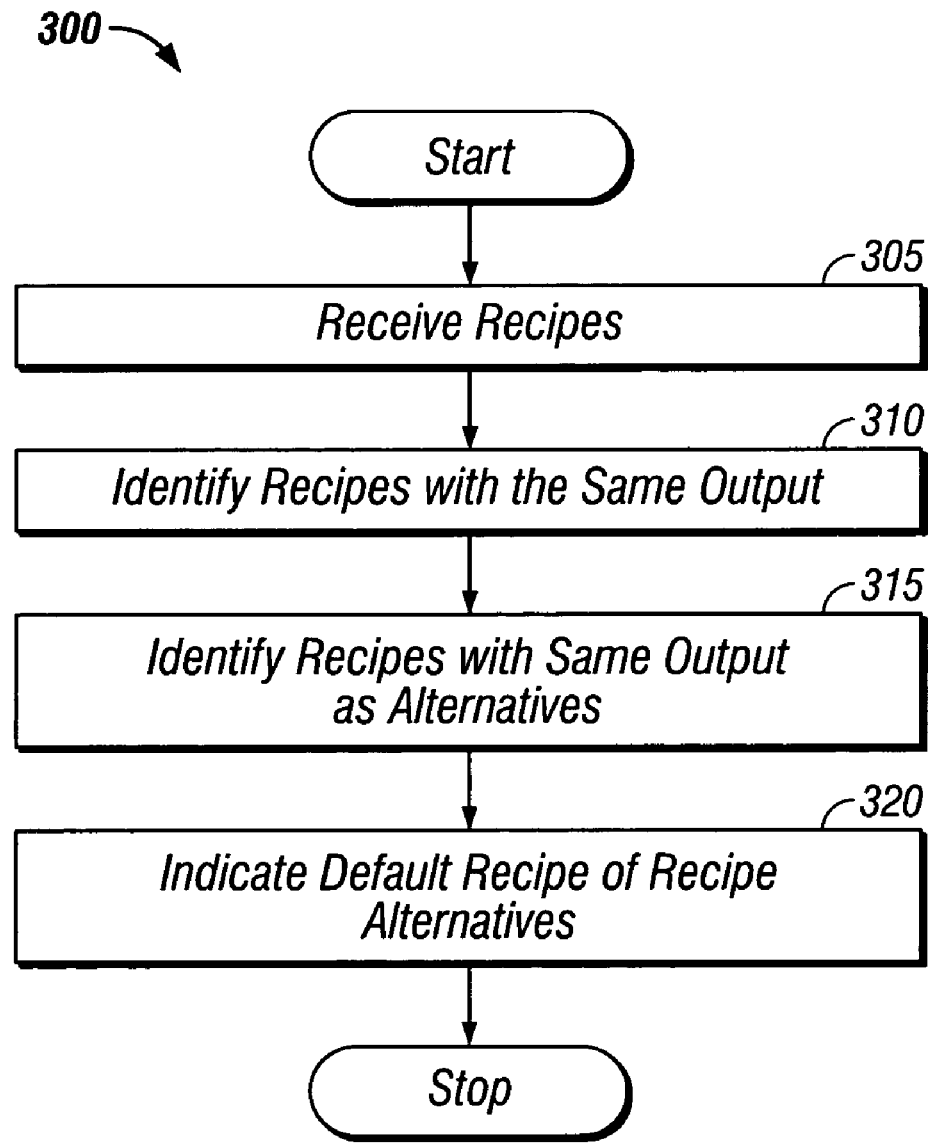
FIG. 3 shows another method for managing recipes and other sets of processing information that describe a process flow.

FIG. 3 shows a method 300, in accordance with the invention, for managing recipes or other sets of processing information that describe a process flow. A system performing the method 100 receives two or more recipes or other sets of processing information that describe a process flow (step 105). At least two of the received recipes are alternatives of the same recipe. Alternatives are recipes that describe different process flows but have the same primary or secondary output. An output is a product or other result of performing the process flow described by the recipe, and a single recipe can have several different outputs. A primary output is the major product or other result of a process flow, whereas a secondary output is a secondary product or other result, such as, e.g., a by-product, of a process flow.

To achieve the same output, alternatives can describe different activities, different formulae, or both. For example, two different alternatives can describe that different amounts of two different catalysts can be used in two different processes to achieve the same average molecular weight of a polymer. Two alternatives can exist in parallel and can be valid simultaneously.

The system identifies the received recipes that have the same output (step 310) and identifies them as alternatives (step 315). The system can identify the alternatives by assigning them a common extension or field, or linking them to an object that identifies a common output.

The system can also mark a recipe as the default or favored alternative for achieving an output (step 320). Since a single recipe can have several different outputs (e.g., by-products of a chemical reaction), a recipe can include several different markings that indicate whether the recipe is the default or favored alternative for achieving each of the different outputs. Moreover, two recipes can be alternatives for one product, but not for a second product.

Furthermore, alternatives can be ranked on a scale according to appeal. For example, one alternative can be flagged as first choice for a specific output, while a second alternative can be flagged as the second choice, and a third alternative can be flagged as the third choice FIG. 4 shows a table 400 wherein several recipe alternatives are managed in accordance with method 300. Table 400 includes recipe records 205, 405, 410 that each describe a process flow for making the same food product. In particular, recipe records 205, 405, 410 can each describe a different recipe for making a spinach omelet. Recipe records 205, 405, 410 can differ, e.g., in either the process flow described using the element hierarchy in field 265 or in the formula described in field 260.

Recipe records 205, 405, 410 can be identified as alternatives by the equivalence of fields 235, 240 in records 205, 405, 410. Moreover, recipe record 205 can be marked as the default recipe record for the output identified in fields 235, 240 by the flag in field 245.

Figure 5:
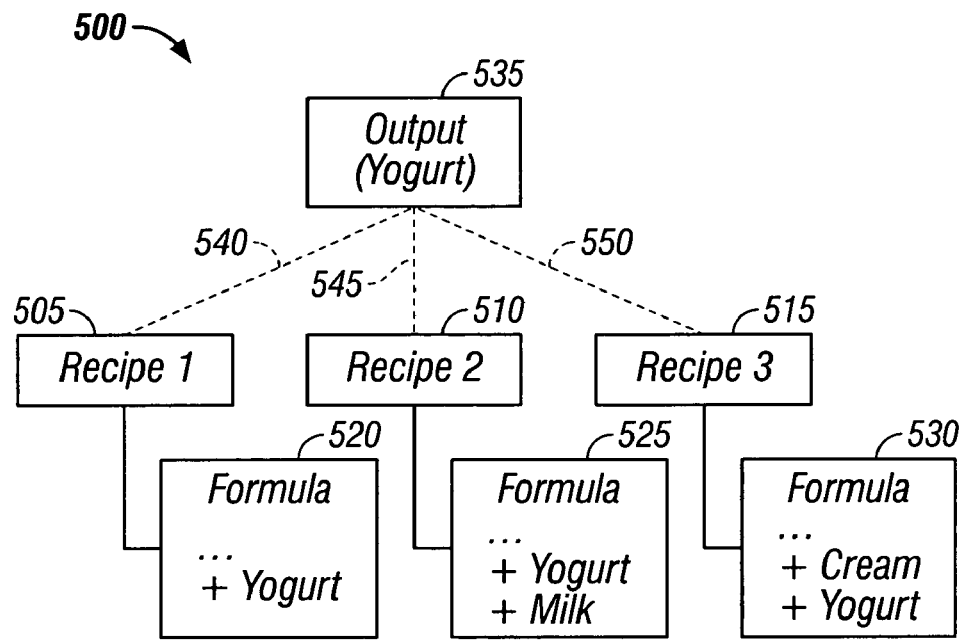
FIG. 5 shows a block diagram of a data structure where recipes, and other sets of processing information that describe a process flow, are managed.

FIG. 5 shows a block diagram of a data structure 500 wherein several recipe alternatives are managed in accordance with method 300. In particular, data structure 500 includes recipe alternatives 505, 510, 515 for producing a same product. In particular, recipe 505 uses a formula 520, recipe 510 uses a formula 525, and recipe 515 uses a formula 530 for producing a yogurt output. The yogurt output is identified in a root object 535 that is linked to recipes 505, 510, 515 by linkages 540, 545, 550. Linkages 540, 545, 550 can be, e.g., pointers and can identify recipes 505, 510, 515 as alternatives for producing the yogurt output identified in root object 535.

The management and ranking of recipe alternatives and other process flow alternatives speeds the identification of existing recipes. In particular, since recipes can be associated and ranked with other recipes that have the same output, a user who is interested in obtaining a particular output can rapidly sort through large numbers of recipes and easily compare the recipe alternatives to identify the recipe with the most favorable characteristics.

Figure 6:
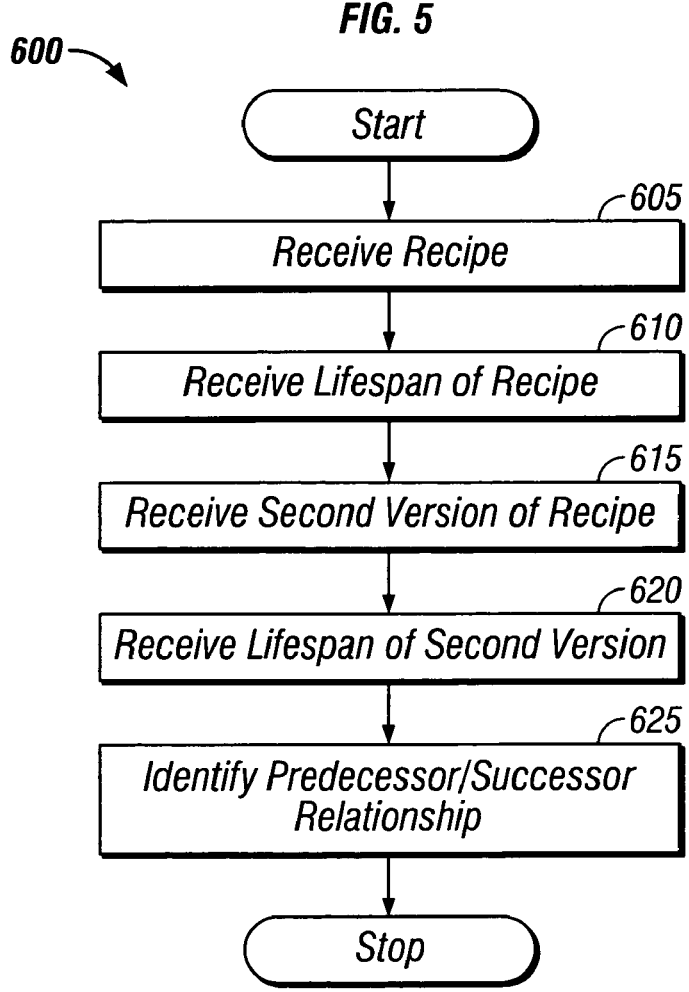
FIG. 6 shows another method for managing change of recipes and other sets of processing information that describe a process flow.

FIG. 6 shows a method 600, in accordance with the invention, for managing change in recipes or other sets of processing information that describe a process flow. A system performing the method 600 receives a recipe or other description of a process flow (step 605). The system also receives a lifespan of the recipe (step 610). A lifespan is a time period for which the recipe is valid.

The system also receives a second version of the recipe (step 615), as well as a lifespan for the second version (step 620). Versions are different recipes with the same output or outputs. However, versions are valid for different periods of time. Versions thus have a chronological sequence and describe the recipe as it exists at different times. In other words, two versions of one recipe produce the same output(s), but one version is valid for a first lifespan that is different from the valid lifespan of a second version. The life spans of different versions can follow one another in time without any overlap, or the life spans can overlap for a transition period when both versions are simultaneously valid. Alternatively, a gap when no versions are valid can exist between the life spans of different versions.

The second version of the recipe can be received by copying the recipe and using the copy as a template for receiving alterations from a user. Alternatively, a user can input the second version from scratch. The name of the original recipe can be maintained, e.g., if a version is created by copying the recipe.

The system also identifies the recipe and the second version of the recipe according to their predecessor/successor relationship (step 625). In other words, the system identifies the recipe and the second version according their life spans, identifying the version with the earlier lifespan as the predecessor and identifying the version with the later lifespan as the successor. Thus, time serves as a one-dimensional parameter that defines the relationship between versions. Aside from the predecessor/successor identification, versions can be independent objects.

The system can identify the predecessor/successor relationship, e.g., by storing a link from the successor to the predecessor. In this case, versions can also be identified using a customer-specific indicator or a completely different name, since different versions can also be identified by the predecessor/successor link.

To identify the predecessor/successor relationship, a suffix for the version can also be added to the recipe ID. The version suffix of the new recipe ID can be automatically increased each time a new version is created.

FIG. 7 shows a table 700 wherein several recipe versions, or versions of other sets of processing information that describe a process flow, are managed in accordance with method 600. Table 700 includes recipe records 205, 705, 710 that each describe a different recipe for making the same food product, but recipes 205, 705, 710 are valid for different periods of time. In particular, recipes 205, 705, 710 include fields 730, 735. Fields 730 and 735 identify the time period for which recipe records 205, 705, 710 are valid.

Recipes 205, 705, 710 can differ in either the process flow described using the element hierarchy in field 265 or in the formula described in field 260. Recipes 205, 705, 710 are valid from the date identified in field 730 to the date identified in field 735. As illustrated, recipe 205 is valid for a lifespan that overlaps with the lifespan of recipe 705. The lifespan of recipe 705 does not overlap with the lifespan of recipe 710.

Recipe records 205, 705, 710 can be identified as versions of the same recipe by suffixes 715, 720, 725 on the recipe ID in field 230. In particular, since suffixes 715, 720, 725 increment in accordance to the final valid date of recipes 205, 705, 710, the predecessor/successor relationship between recipes 205, 705, 710 is identified.

Figure 8:
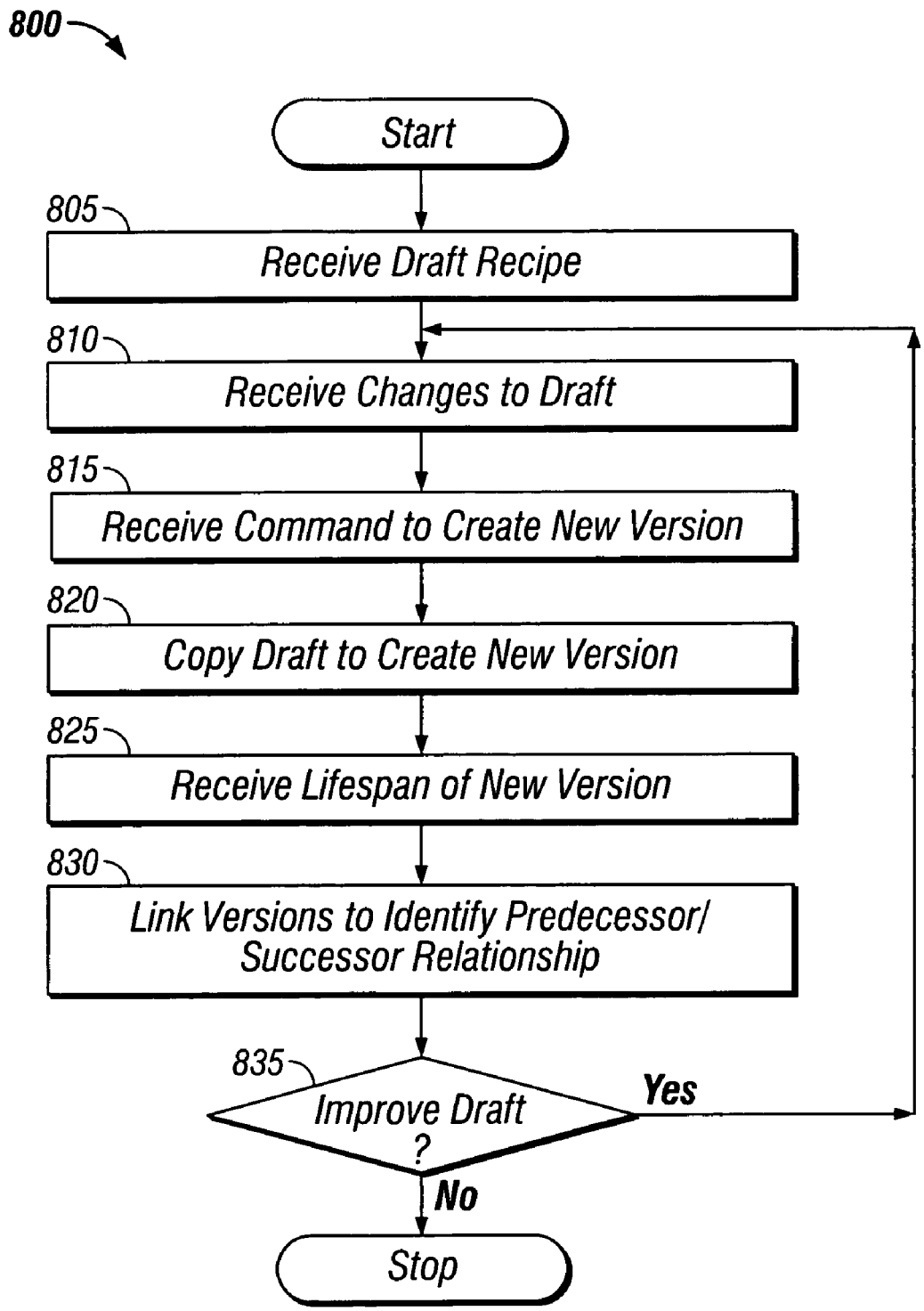
FIG. 8 shows another method for managing change of recipes and other sets of processing information that describe a process flow.

FIG. 8 shows a method 800 for managing change of recipes or other sets of processing information that describe a process flow. A system performing the method 800 receives a draft recipe or other draft description of a process flow (step 805). A draft recipe is a recipe that is used to make proposals during the development or improvement of a recipe or recipe version. A draft recipe can have several change states that are continuously or intermittently updated to reflect the current approaches to improving the recipe. The multiple change states are, however, identified by the same recipe ID. A recipe and a version of a recipe can have multiple drafts that reflect multiple approaches to improving or developing the recipe or the recipe version. Since drafts work with continuously or intermittently updated change states, the data volume on a database that stores drafts can be relatively small.

The system can receive a draft recipe that is generated from scratch by a user, or the system can receive identification of a recipe or recipe version that is to be copied and used as a template for the draft. The system can identify the received draft recipe by, e.g., adding an additional suffix to the recipe ID to identify the draft. The identifying suffix can be changed, e.g., by a user-exit. If a recipe version is copied to create a new draft, the version identification need not be changed. Instead, an additional draft index can be added so that the version identification still refers to the source version.

The system also receives changes to the draft (step 810) that reflect the development or improvement of the recipe. The changes can alter any portion of the recipe, including the formula and the process flow. At some point the system will receive a command from a user that indicates that a new recipe version is to be created from the current change state of the draft (step 815). In response to receipt of this command, the system copies the current change state of the draft to create a new version (step 820). The draft can be copied by, e.g., duplicating the process flow and the formula of the draft recipe into the new version of the recipe. The system also receives a lifespan of the new version of the recipe (step 825), and identifies the new version of the recipe and the current version of the recipe according to their predecessor/successor relationship (step 830).

At some point the user can indicate to the system that further improvement or development of the draft recipe is no longer desired (decision 835). If this is the case, then the system proceeds to end the process flow of method 800. On the other hand, if further development is desired, then the system receives further changes to the draft that reflect the development or improvement of the recipe as before.

FIG. 9 shows a draft recipe 900 that can be used to manage change of recipes or other sets of processing information that describe a process flow in accordance with method 800. Draft recipe 900 describes a process flow for making a food product and includes a description of a process flow at element hierarchy field 265 and a description of the formula in field 260. A user can change either element hierarchy field 265 of the formula in field 260 to make proposals during the development or improvement of draft recipe 900.

Draft recipe 900 includes an ID field 905 that includes a draft recipe ID number that can act as a semantic key for draft recipe 900. The draft recipe ID number includes a first suffix 910 and a second suffix 915. First suffix 910 identifies the source version of draft recipe 900, and second suffix 915 acts as a draft index to identify the approach, particular to draft recipe 900, for improving or developing the source recipe.

Draft recipe 900 also includes a field 920 that identifies the last date on which draft recipe 900 was updated. A user can use a date in field 920 to determine if draft recipe 900 is indeed current or to determine if draft recipe 900 is to be copied to create a new version of the source recipe.

Figure 10:
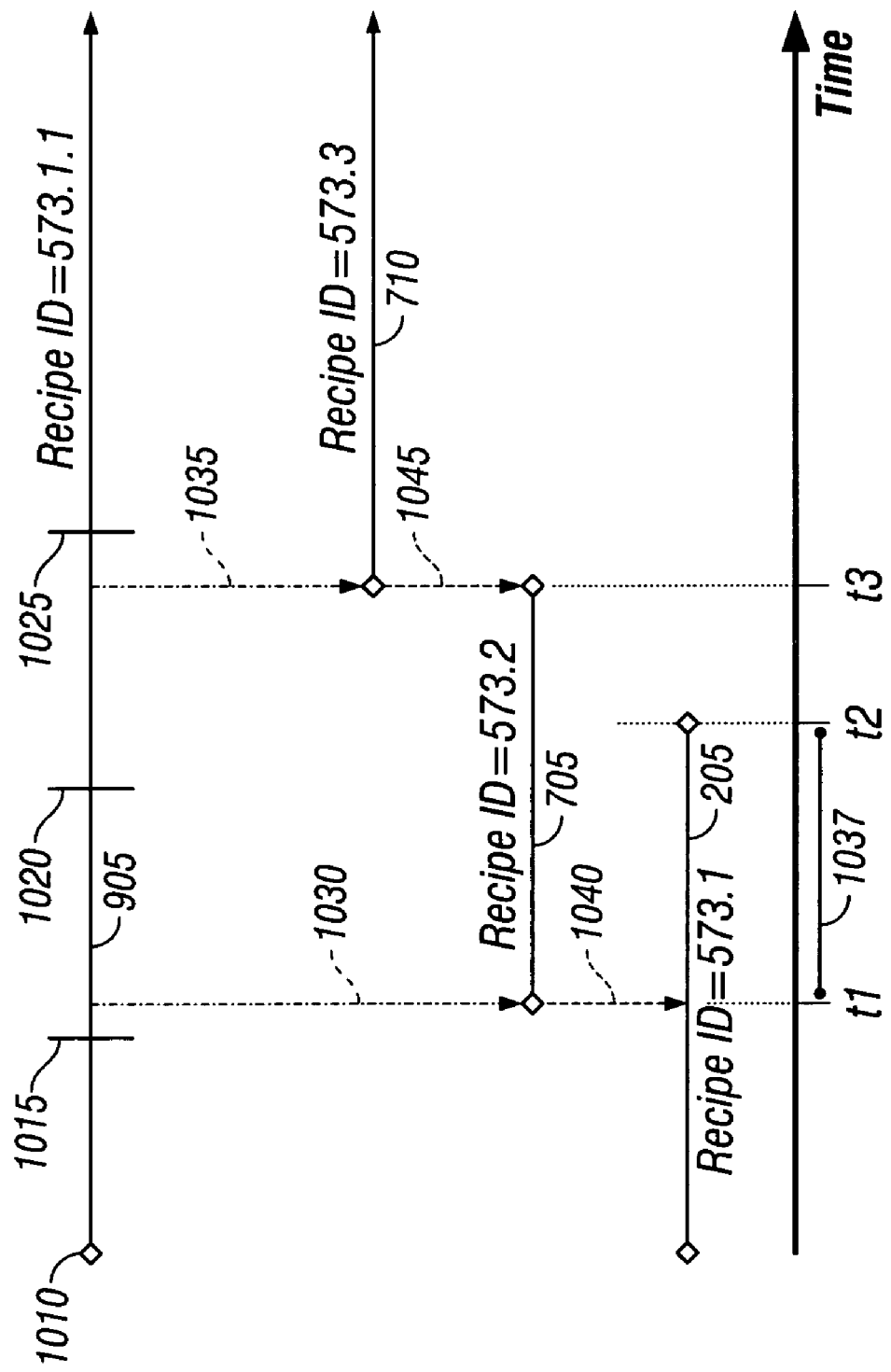
FIG. 10 schematically illustrates the operation of a method for classifying and managing recipes and other sets of processing information that describe a process flow.

FIG. 10 schematically illustrates the operation of method 800. The system performing method 800 receives a draft recipe 905 at a time 1010. The system also receives intermittent changes to draft recipe 905 at times 1015, 1020, 1025. These change states are identified under the same semantic key ID, namely "573.1.1."

At times t1 and t3, the system receives a copy command and proceeds to copy draft recipe 905 to create new versions of recipe 205. In particular, the system creates versions 705, 710, as indicated by dashed arrows 1030, 1035. The system also receives a definition of the life spans of versions 705, 710. The lifespan of version 205 overlaps with the lifespan of version 705 over a period 1037 between time t1 and time t2. The lifespan of versions 705, 710 follow one another without an overlap or a gap.

The sequence of the life spans, and the predecessor/successor relationship, can be identified using the semantic key of versions 205, 705, 710. In particular, the semantic key of version 205 can be "573.1," the semantic key of version 705 can be "573.2," and the semantic key of version 710 can be "573.3." The suffixes of the semantic keys indicate the predecessor/successor relationship.

The system can also link versions 205, 705, 710 to identify predecessor/successor relationships. In particular, the system can create a link 1040 between version 705 and version 205 and a link 1045 between version 710 and version 705. Links 1040, 1045 can be included in link fields in versions 705, 710 (not shown).

Versions 205, 705, 710 do not include change states because a complex time dependency would result. Alternatively, versions 205, 705, 710 can include change states on one level of the element hierarchy that describes the process flow, such as the application level. However, in some cases, including change states in versions 205, 705, 710 may be desirable.

Figure 11:
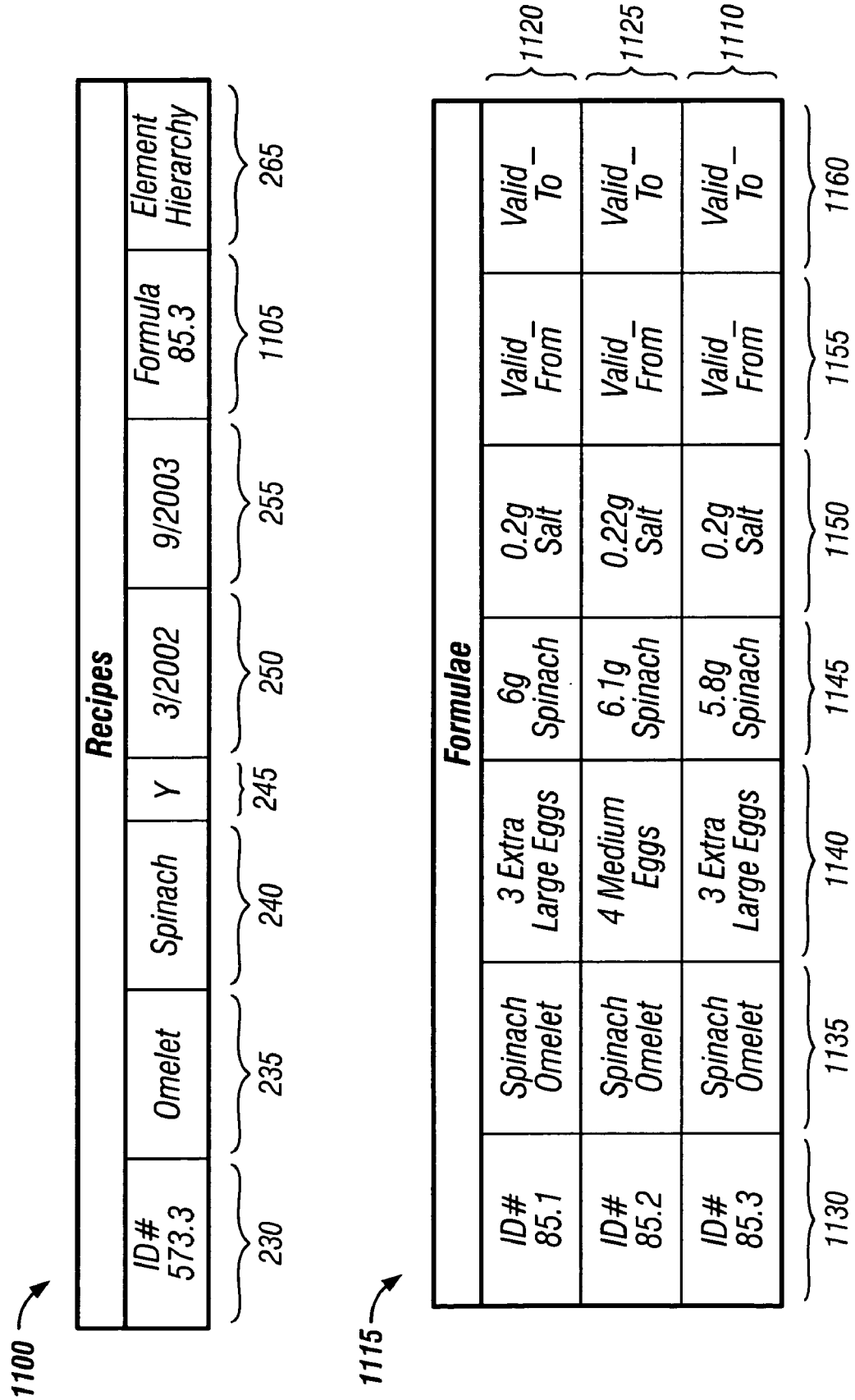
FIG. 11 shows a recipe and a formula table that can be used to manage change of recipes and other sets of processing information that describe a process flow.

As shown in FIG. 11, a recipe 1100 need not include a formula field 260 as an inherent portion of the description of the recipe. Rather, recipe 1100 can include a formula link 1105 that identifies a formula record 1110. Formula record 1110 is independent of recipe 1100 in that changes to formula record 1110 do not necessarily result in the creation of a new version of recipe 1100. Likewise, changes to recipe 1100 (e.g., changes to the element hierarchy in field 265) do not necessarily result in the creation of a new version of formula record 1110. Rather, changes to formula record 1110 can result in the creation of a new version of formula record 1110 independently of recipe 1100.

A formula table 1115 includes formula record 1110, along with other formula record versions 1120, 1125. Formula record versions 1110, 1120, 1125 describe the inputs and outputs of recipe 1100. Formula record versions 1110, 1120, 1125 can be versions of the same formula with the same outputs, but different inputs.

Table 1115 also includes fields 1130, 1135, 1140, 1145, 1150, 1155, 1160. Field 1130 can include formula ID numbers that act as semantic keys for formula records 1110, 1120, 1125. The formula ID numbers in field 1130 can include suffixes 1165, 1170, 1175 that indicate the predecessor/successor relationships between formula records 1110, 1120, 1125. Field 1135 can include information that identifies the output of recipes that link to the formula records. Fields 1140, 1145, 1150 can include information that identifies the inputs to recipes that link to the formula records. Field 1155, 1160 can identify the life spans for which formula records 1110, 1120, 1125 are valid.

The versions of formula records 1110, 1120, 1125 can have a chronological sequence and describe the formula of a single recipe as it exists at different times. One formula version can be valid for a first lifespan that is different from the valid lifespan of a second formula version. The life spans of different formula versions can follow one another in time without any overlap, or the life spans can overlap for a transition period when both formula versions are simultaneously valid. Alternatively, a gap can exist between the life spans of different formula versions. A predecessor/successor relationship can also be indicated, e.g., using a separate link between formula records 1110, 1120, 1125.

Figure 12:
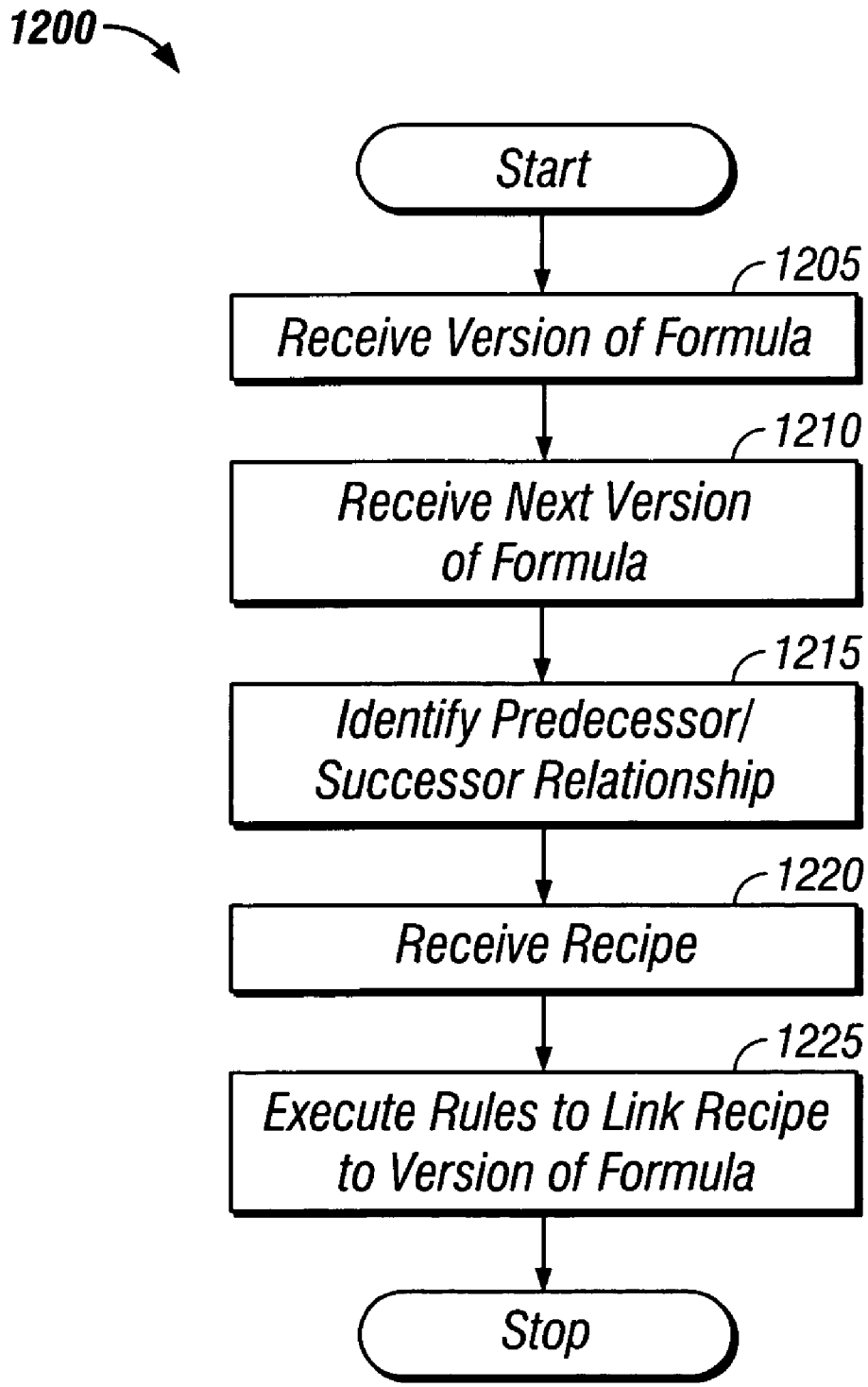
FIG. 12 shows another method for managing change of recipes and other sets of processing information that describe a process flow.

FIG. 12 shows a method 1200, in accordance with the invention, for managing change of recipes or other sets of processing information that describe a process flow. In particular, method 1200 relates to the management of independent recipe versions and formula versions.

A system performing the method 1200 receives a first version of a formula (step 1205) and a second version of the formula (step 1210). The first and second versions are independent of a recipe. The system can store the versions in a table, such as table 1115, if needed. The system also receives the life spans of the versions of the formula, which can be used to identify the predecessor/successor relationship of the versions of the formula (step 1215). To identify the predecessor/successor relationship, a suffix can be added to the formula ID. The suffix of the new formula ID can be automatically increased each time a new version is received. Alternatively, the predecessor/successor relationship can be indicated using a separate link between the received formula versions.

The system also receives a recipe (step 1220) that is independent of the versions of the formula. The recipe can be, e.g., a version of an existing recipe or a new recipe that can use the formulae described by the received versions. The system automatically links the received recipe to one of the two versions of the formula by executing rules for selecting the version (step 1225). For example, the system can execute a rule that states that the recipe is always to be linked to the most recent version of the formula to identify that the recipe is to be linked to the second version of the formula. Execution and linking can be done without consulting a user.

Figure 13:
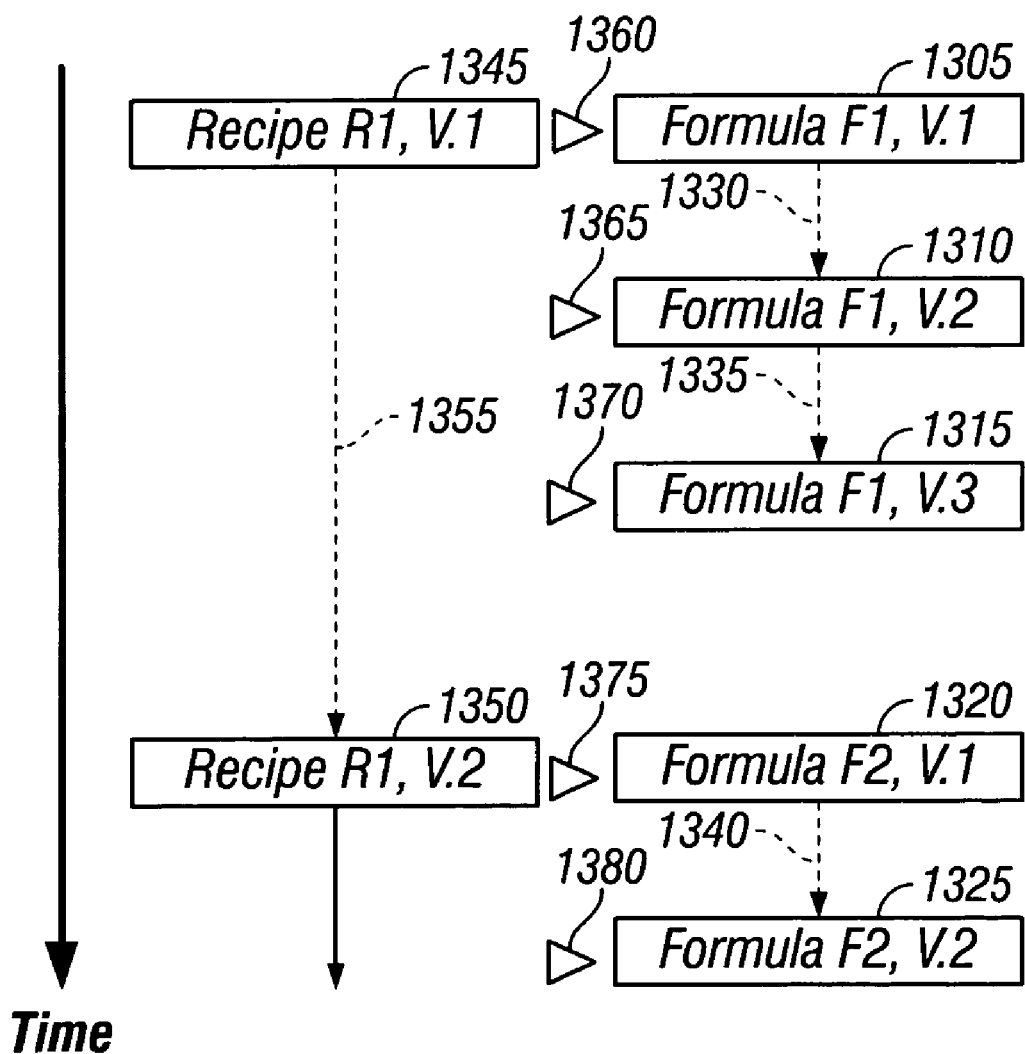
FIG. 13 schematically illustrates the operation of another method for managing change of recipes and other sets of processing information that describe a process flow.

FIG. 13 schematically illustrates the operation of method 1200. The system performing method 1200 receives formula versions 1305, 1310, 1315, 1320, 1325. Formula versions 1305, 1310, 1315 are joined by links 1330, 1335 to indicate predecessor/successor relationships, and formula versions 1320, 1325 are joined by link 1340 to indicate a predecessor/successor relationship. The absence of a link between formula version 1315 and formula version 1320 indicates that formula versions 1315, 1320 are not versions of the same formula but instead are, e.g., formula alternatives or variants.

The system performing method 1200 also receives recipe versions 1345, 1350. Recipe versions are joined by a link 1355 to indicate predecessor/successor relationships.

The system automatically links recipe versions 1345, 1350 to formula versions 1305, 1310, 1315, 1325 using linkages 1360, 1365, 1370, 1375, 1380. The system establishes linkages 1360, 1365, 1370, 1375, 1380 based on a rule that selects formula versions 1305, 1310, 1315, 1325 for linkage and excludes formula version 1320 from linkage. The rule can indicate, e.g., that linkages 1360, 1365, 1370, 1375, 1380 are to be automatically established to the most recent version of the formula.

Rules for establishing linkages to independent formulae can also be used to manage versioning of the recipes themselves. For example, when the system links recipe 1345 to formula versions 1310, 1315, the version of recipe 1345 does not change. On the other hand, when the system links recipe 1345 to formula version 1320, recipe version 1350 is created. In particular, the system identifies that formula version 1320 is not a version of formula versions 1305, 1310, 1315, but rather, e.g., an alternative or a variant of formula versions 1305, 1310, 1315. The system then automatically receives recipe version 1350 by copying recipe version 1345 and automatically linking it to formula version 1320.

Figure 14:
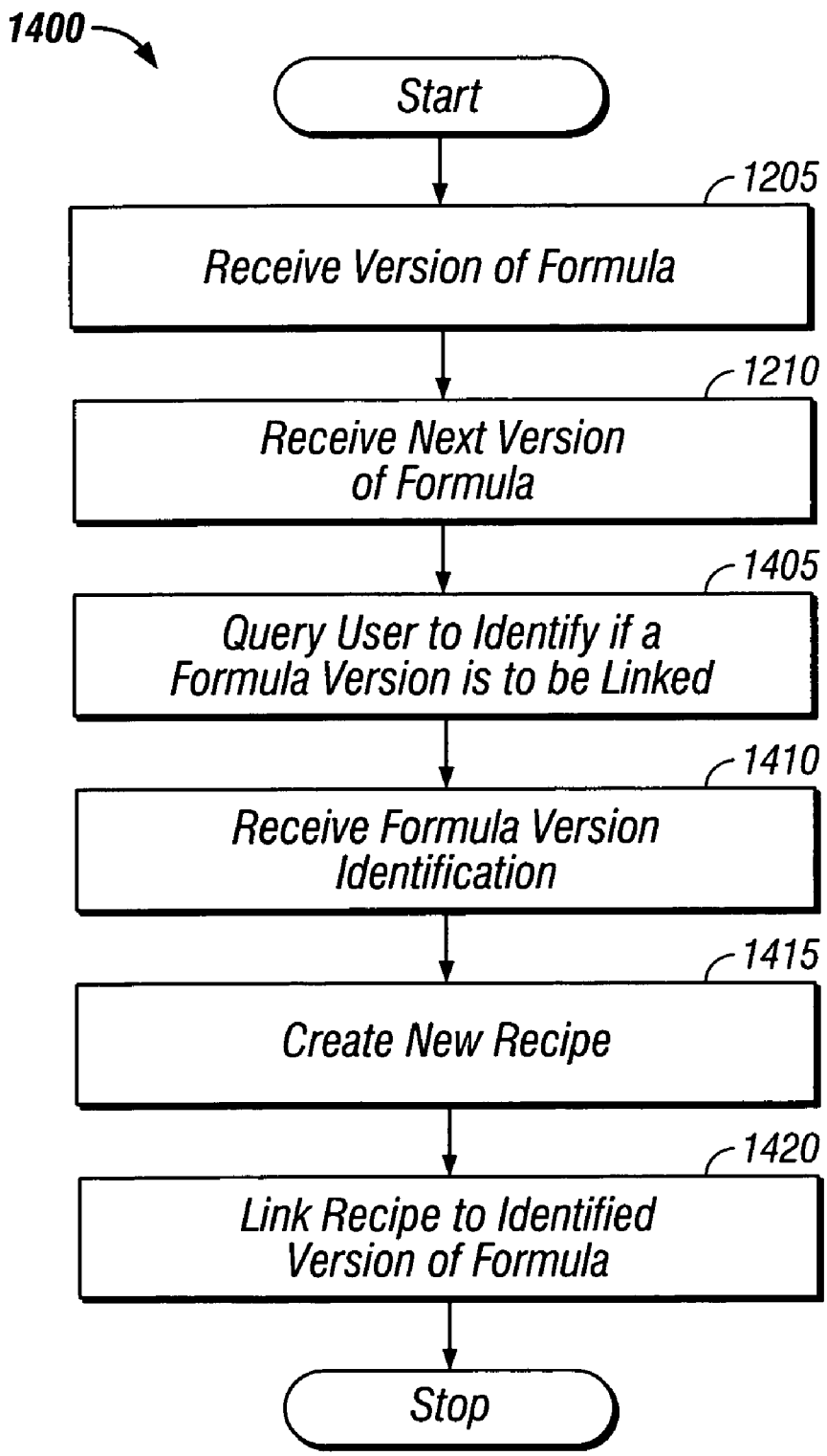
FIG. 14 shows another method for managing change of recipes and other sets of processing information that describe a process flow.

FIG. 14 shows a method 1400 for managing change of recipes or other sets of processing information that describe a process flow. In particular, method 1400 relates to the change management of independent recipe versions and formula versions.

A system performing the method 1400 receives a first version of a formula (step 1205) and a second version of the formula (step 1210) that are independent of a recipe. The system can identify a predecessor/successor relationship between the versions of the formula.

Rather than automatically linking the recipe to a formula, the system queries a user to identify if a formula version is to be linked to a recipe (step 1405). The query can be presented to a human user over a monitor or other output device. The system receives user input that identifies that one of the first version of the formula and the second version of the formula is to be linked (step 1410). The input can be received from a human user over an input device such as a keyboard or a mouse. Based on the received input, the system creates a new version of a recipe (step 1415) and links the new version of the recipe to the identified version of the formula (step 1420). The new version of the recipe can be created, e.g., by copying a previous version of the recipe, including the previous process element hierarchy.

Figure 15:
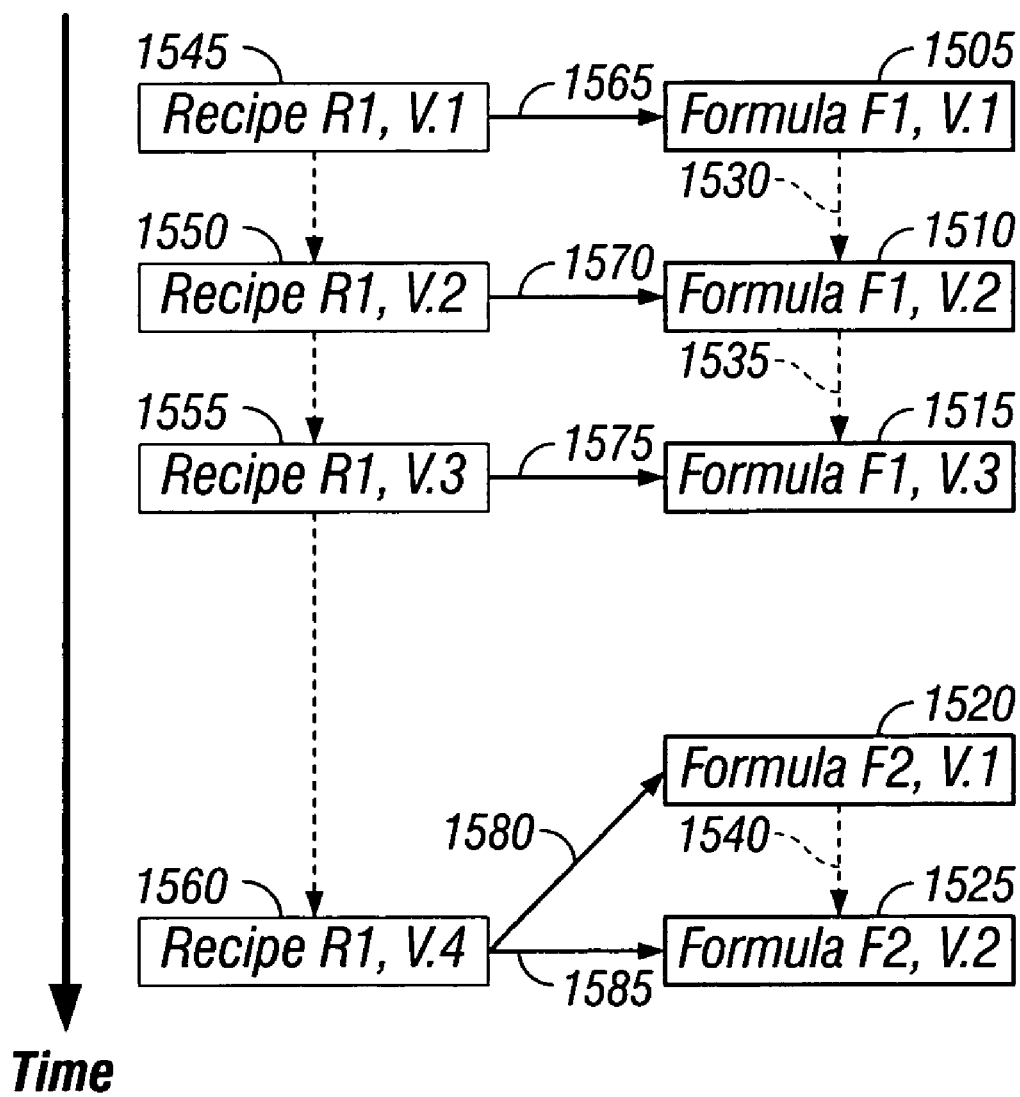
FIG. 15 schematically illustrates the operation of another method for managing change of recipes and other sets of processing information that describe a process flow.

FIG. 15 schematically illustrates the operation of method 1400. The system performing method 1400 receives formula versions 1505, 1510, 1515, 1520, 1525. Formula versions 1505, 1510, 1515 are joined by links 1530, 1535, and formula versions 1520, 1525 are joined by a link 1540 to indicate predecessor/successor relationships.

The system performing method 1400 also receives, from a user, an indication that a recipe is to be linked to one of formula versions 1505, 1510, 1515, 1520, 1525. In response to receipt of the indication, the system creates recipes 1545, 1550, 1555, 1560 and links them to the indicated formula versions 1505, 1510, 1515, 1520, 1525. For example, the system links recipe 1545 to formula version 1505 using link 1565, recipe 1550 to formula version 1510 using link 1570, and recipe 1555 to formula version 1515 using link 1575.

The system can link recipe 1560 to formula version 1520 using link 1580 or the system can link to formula version 1525 using link 1585, depending on the indication received from the user. For example, if formula versions 1520, 1525 are valid for the same period, then the user can select the formula version to which recipe 1560 is to be linked.

Method 1400 requires relatively more user input than method 1200. In particular, method 1400 requires user input to identify the version of formula for linkage. This provides greater oversight to the user and increases the transparency of the resultant recipes.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, the method described herein can be combined into a single method and performed on a single system. Accordingly, other embodiments are within the scope of the following claims.

What is claimed is:

1. A machine-implemented method for managing information describing a process flow, comprising:
   receiving, at a data processing system for managing process flow information, an element hierarchy that is machine readable and that describes activities for performing the process flow using different classes of process elements, wherein the process elements are arranged in the element hierarchy to describe the activities of the process flow at various levels of detail, wherein the element hierarchy is independent of a formula that describes inputs and outputs of the process flow in that changes to the element hierarchy do not result in the creation of a new version of formula record in the data processing system for managing process flow information;
   receiving, at the data processing system for managing process flow information, a first formula description that is machine readable and that describes a first input and an output of the process flow, wherein the first formula description is independent of the element hierarchy in that changes to the first formula description do not result in the creation of a new version of the element hierarchy in the data processing system for managing process flow information;
   receiving, at the data processing system for managing process flow information, a second formula description that is machine readable and describes a second input and the same output of the process flow, wherein the second formula description is independent of the element hierarchy in that changes to the second formula description do not result in the creation of a new version of the element hierarchy in the data processing system for managing process flow information;
   associating the element hierarchy with one of the first formula description and the second formula description to form an association between the element hierarchy and the one of the first formula description and the second formula description; and
   storing the element hierarchy in association with the one of the first formula description and the second formula description in a data storage device.

2. The method of claim 1, further comprising determining whether to associate the element hierarchy with the first formula description or the second formula description.

3. The method of claim 2, wherein determining whether to associate the element hierarchy with the first formula description or the second formula description further comprises executing a rule to make the determination.

4. The method of claim 2, wherein determining whether to associate the element hierarchy with the first formula description or the second formula description further comprises receiving input from a user, the input identifying one of a first process element in the element hierarchy and a second process element in the element hierarchy for association with the first activity description.

5. The method of claim 1, wherein associating the element hierarchy comprises providing the element hierarchy with a key that is machine readable and identifies the element hierarchy.

6. The method of claim 1, wherein associating the element hierarchy comprises copying a first process element into the element hierarchy from a second element hierarchy that is machine readable.

7. The method of claim 6, wherein copying the first process element comprises identifying a relationship between the element hierarchy and the second element hierarchy, wherein the relationship is machine-readable.

8. The method of claim 7, wherein the relationship comprises a machine-readable predecessor/successor relationship between the element hierarchy and the second element hierarchy.

9. The method of claim 7, wherein identifying the relationship comprises linking the element hierarchy and the second element hierarchy using a machine-readable link.

10. The method of claim 1, wherein associating the element hierarchy comprises linking the element hierarchy to one of the first formula description and the second formula description using a machine-readable link.

11. The method of claim 1, wherein associating the element hierarchy comprises adding one of the first formula description and the second formula description to a recipe that includes the element hierarchy.

12. The method of claim 1, wherein:
   the first formula description comprises a first lifespan of the first formula description, wherein the first lifespan is a time period for which the first formula description is valid in the data processing system for managing process flow information; and
   the second formula description comprises a second lifespan of the second formula description, wherein the second lifespan is a time period for which the second formula description is valid in the data processing system for managing process flow information.

13. The method of claim 12, wherein the first lifespan and the second lifespan overlap.

14. The method of claim 12, further comprising linking the first formula description and the second formula description based on the first lifespan and the second lifespan.

15. The method of claim 1, wherein the second formula description comprises an alternative to the first formula description.

16. The method of claim 1, wherein the element hierarchy describes a conversion of a material.

17. The method of claim 16, further comprising converting the material in accordance with the element hierarchy.

18. The method of claim 1, wherein the element hierarchy comprises a machine-readable recipe.

19. The method of claim 1, further comprising identifying a predecessor/successor relationship between the first formula description and the second formula description.

20. The method of claim 1, wherein the first formula description and the second formula description are joined by a machine-readable link that identifies a predecessor/successor relationship therebetween.

21. The method of claim 1, wherein associating the element hierarchy with one of the first formula description and the second formula description comprises labeling the association as a new version of the element hierarchy using a machine-readable label.

22. The method of claim 1, further comprising producing the output using the activities and input described in the association of the element hierarchy with the one of the first formula description and the second formula description, wherein producing the output comprises converting, transporting, or storing material or energy.

23. The method of claim 1,
further comprising managing the information describing the process flow, including retrieving the association from the data storage device.

* * * * *